US009869832B2

(12) United States Patent
Jokura (10) Patent No.: US 9,869,832 B2
(45) Date of Patent: Jan. 16, 2018

(54) OPTICAL FIBER CABLE-EQUIPPED CONNECTOR

(71) Applicant: HIROSE ELECTRIC CO., LTD., Tokyo (JP)

(72) Inventor: Kiyoshi Jokura, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 15/346,631

(22) Filed: Nov. 8, 2016

(65) Prior Publication Data

US 2017/0131490 A1 May 11, 2017

(30) Foreign Application Priority Data

Nov. 10, 2015 (JP) .................................. 2015-220281

(51) Int. Cl.
*G02B 6/36* (2006.01)
*G02B 6/42* (2006.01)

(52) U.S. Cl.
CPC ......... *G02B 6/4236* (2013.01); *G02B 6/4278* (2013.01); *G02B 6/4292* (2013.01)

(58) Field of Classification Search
CPC .... G02B 6/428; G02B 6/4236; G02B 6/4278; G02B 6/4292
See application file for complete search history.

(56) References Cited

U.S. PATENT DOCUMENTS

| 4,720,630 A * | 1/1988 | Takeuchi ............. | G02B 6/4202 |
| | | | 250/227.24 |
| 8,511,913 B2 * | 8/2013 | Ishii ..................... | G02B 6/4201 |
| | | | 385/89 |
| 9,250,405 B2 * | 2/2016 | Tong .................... | G02B 6/4284 |
| 9,335,496 B2 * | 5/2016 | Ito ........................ | G02B 6/428 |
| 9,363,020 B2 * | 6/2016 | Kurashima ........... | H04B 10/40 |
| 9,523,827 B2 * | 12/2016 | Sano .................... | G02B 6/4256 |
| 9,625,663 B2 * | 4/2017 | Akabane ............... | G02B 6/423 |
| 2009/0010600 A1 * | 1/2009 | Kim ..................... | G02B 6/4292 |
| | | | 385/90 |

(Continued)

FOREIGN PATENT DOCUMENTS

JP        2015-045787        3/2015

*Primary Examiner* — Rhonda Peace
(74) *Attorney, Agent, or Firm* — Procopio, Cory, Hargreaves & Savitch LLP (57) ABSTRACT

An optical fiber cable-equipped connector that is electrically connectable to a mating electrical connector; the optical fiber cable-equipped connector comprises a conversion element, to which a cable-side optical fiber core exposed from the end of an optical fiber cable is connected and which converts optical signals and electrical signals, and a circuit board that is electrically connected to the conversion element; the conversion element comprises a conversion element-side optical fiber core, to which the cable-side optical fiber core is connected; the opto-electrical conversion connector comprises the conversion element-side optical fiber core disposed on the mounting face of the circuit board, and an optical fiber connection support that supports the connected portion with the conversion element-side optical fiber core and the cable-side optical fiber core; and the optical fiber connection support comprises the alignment support that supports and aligns the conversion element-side optical fiber core and the cable-side optical fiber core.

6 Claims, 7 Drawing Sheets

(56) References Cited

U.S. PATENT DOCUMENTS

| | | | |
|---|---|---|---|
| 2012/0181535 A1* | 7/2012 | Ito | G02B 6/428 |
| | | | 257/48 |
| 2015/0078760 A1* | 3/2015 | Kurashima | H04B 10/40 |
| | | | 398/139 |
| 2016/0259137 A1* | 9/2016 | Akabane | G02B 6/4292 |

* cited by examiner

OPTICAL FIBER CABLE-EQUIPPED CONNECTOR

This application claims the priority of Japanese Patent Application No. 2015-220281, filed on Nov. 10, 2015, the contents of which is incorporated by reference in its entirety.

BACKGROUND

1. Field

The present invention relates to an optical fiber cable-equipped connector, in which the optical fiber cable is connected to an opto-electrical conversion connector that converts optical signals and electrical signals.

2. Related Art

The connector in Patent Document 1 is a known example of such an optical fiber cable-equipped connector. The connector in Patent Document 1 is such that the interior space of a housing is divided in two, above and below, by a circuit board having a connection part that can be connected to a mating electrical connector. In the lower space, the extra length portion of the optical fiber cable is wound onto a cylindrical winder, such that the extra length portion of the optical fiber cable is housed therein. Meanwhile, the upper space houses an opto-electrical conversion module, to which the end of the optical fiber cable contiguous with the above-mentioned extra length portion is connected and which converts optical signals and electrical signals, and a connection module that is disposed on the upper face of the circuit board and is electrically connected to the opto-electrical conversion module.

PRIOR ART DOCUMENTS

Patent Document

Patent Document 1: Japanese Laid-Open Patent Application 2015-045787

SUMMARY

Problems to be Solved by the Invention

In the course of manufacturing the connector in Patent Document 1, the optical fiber core exposed at the end of the optical fiber cable is connected to the opto-electrical conversion module. This connection of the optical fiber core is accomplished by aligning the optical fiber core with the opto-electrical conversion module to put it in the proper position, and then fixing it with an adhesive or the like. As a matter of fact, what is contiguous with the optical fiber core to be fixed (the exposed optical fiber core) is the lengthy main portion of the optical fiber cable (the portion that makes up the overall length of the optical fiber cable in a finished product). When the optical fiber core contiguous with the long main portion is aligned precisely with the opto-electrical conversion module, the main portion is so long and so rigid that the orientation of the optical fiber core tends to be unstable, making it extremely difficult to position the optical fiber core. Therefore, a large alignment apparatus is required, and furthermore the connection work is complicated and takes a long time. Also, since this connection work is carried out after the overall length of the optical fiber cable as a finished product has been established, it ends up taking a long time from manufacturing preparation to completion of the finished product.

In view of this situation, it is an object of the present invention to provide an optical fiber cable-equipped connector, in which the work of connecting the optical fiber core is easy.

The optical fiber cable-equipped connector pertaining to the present invention is a an optical fiber cable-equipped connector, in which an optical fiber cable is connected to an opto-electrical conversion connector that converts optical signals and electrical signals, wherein the opto-electrical conversion connector is electrically connectable to a mating electrical connector, the mating electrical connector being the connection counterpart of the opto-electrical conversion connector, and the optical fiber cable-equipped connector comprises a conversion element, to which a cable-side optical fiber core exposed from the end of the optical fiber cable is connected and which converts optical signals and electrical signals, and a circuit board that is electrically connected to the conversion element.

With the present invention, such an optical fiber cable-equipped connector is characterized by the fact that the conversion element comprises a conversion element-side optical fiber core to which the cable-side optical fiber core is connected; the opto-electrical conversion connector comprises an optical fiber connection support that is disposed on a mounting face of the circuit board to support the connected portions of the conversion element-side optical fiber core and the cable-side optical fiber core; and the optical fiber connection support comprises an alignment support that supports and aligns said conversion element-side optical fiber core and said cable-side optical fiber core.

With the present invention, in the manufacture of an optical fiber cable-equipped connector, the conversion element-side optical fiber core of a conversion element and the cable-side optical fiber core of the optical fiber cable are connected, and this connected portion is supported by an optical fiber connection support. That is, unlike in the past, there is no need for the cable-side optical fiber core exposed at the end of the optical fiber cable to be aligned with the conversion element main body (the main portion of the conversion element, where the conversion element has the function of converting optical signals and electrical signals). Also, when the conversion element-side optical fiber core and the cable-side optical fiber core are connected, the optical fiber cores are automatically aligned merely by disposing them in the alignment support of the optical fiber connection support, so the work of connecting the optical fiber cores together is simple. Therefore, with the present invention, the conversion element and the main portion of the optical fiber cable can be connected in a simple manner and in a short time.

Also, with the present invention, the conversion element is manufactured before the conversion element-side optical fiber core and the cable-side optical fiber core are connected. The manufacture of the conversion element entails the work of aligning and connecting the conversion element-side optical fiber core with the conversion element main body. However, since the overall length of the conversion element-side optical fiber core is short, the work involved in connecting the conversion element-side optical fiber core to the conversion element main body is simple compared to when a cable-side optical fiber core contiguous with the main portion of a long optical fiber cable is connected to the conversion element main body as was done in the past.

With the present invention, the opto-electrical conversion connector may further comprise an electrical connection element that is disposed on the mounting face of the circuit board to electrically connect the circuit board and the conversion element.

With the present invention, in the optical fiber cable-equipped connector, the conversion element, the optical fiber connection support, and the cable-side optical fiber core may be respectively disposed on both sides of the circuit board of the opto-electrical conversion connector. This configuration allows for more optical fiber cables to be connected to a single opto-electrical conversion connector.

With the present invention, the opto-electrical conversion connector may be respectively connected to both ends in the lengthwise direction of the optical fiber cable.

With the present invention, the opto-electrical conversion connector is electrically connectable to the mating electrical connector, with the connector-connecting direction being parallel to the mounting face of the circuit board and facing forward toward the mating electrical connector, and the conversion element may be placed forward of the optical fiber connection support and may be disposed at a position having an overlapping range with said optical fiber connection support in a direction perpendicular to said connector-connecting direction. When a conversion element is disposed in this way, the size of an opto-electrical conversion connector can be made smaller in the direction perpendicular to the above-mentioned connection direction.

With the present invention, the opto-electrical conversion connector may be connected to an electrical cable in addition to the optical fiber cable.

Effects of the Invention

With the present invention, in the manufacture of an optical fiber cable-equipped connector, the conversion element-side optical fiber core of the conversion element and the cable-side optical fiber core of the optical fiber cable are automatically aligned merely by disposing these optical fiber cores in the alignment support of the optical fiber connection support, such that the optical fiber cores can be connected together in a simple manner. As a result, the conversion element and the main portion of the optical fiber cable can be connected in a simple manner and in a short time. Also, in the manufacture of the conversion element, only the conversion element-side optical fiber core of a short overall length needs to be connected to the conversion element main body, and therefore, the work of connecting the optical fiber core to the conversion element main body can be performed in a simpler manner and in less time compared to the conventional connection work.

Also, even when the overall length of the main portion of the optical fiber cable has been established and the conversion element-side optical fiber core and the cable-side optical fiber core are connected, preparing, in advance of establishing the above-mentioned overall length of the finished product, a conversion element comprising a conversion element-side optical fiber core of a specified length allows such connection work to be carried out quickly, and as a result the duration from manufacturing preparation to completion of the finished product can be much shorter than in the past. Also, even if the overall length of the main portion varies in each finished product, since a conversion element having a conversion element-side optical fiber core of the same length can be used for all the products, there is no need to prepare various conversion elements having different lengths of the conversion element-side optical fiber core, nor a need to prepare a dedicated alignment apparatus suited to the overall length of the main portion of the optical fiber cable for each product.

DETAILED DESCRIPTION

Embodiments of the present invention will now be described with reference to the appended drawings.

Figure 1:
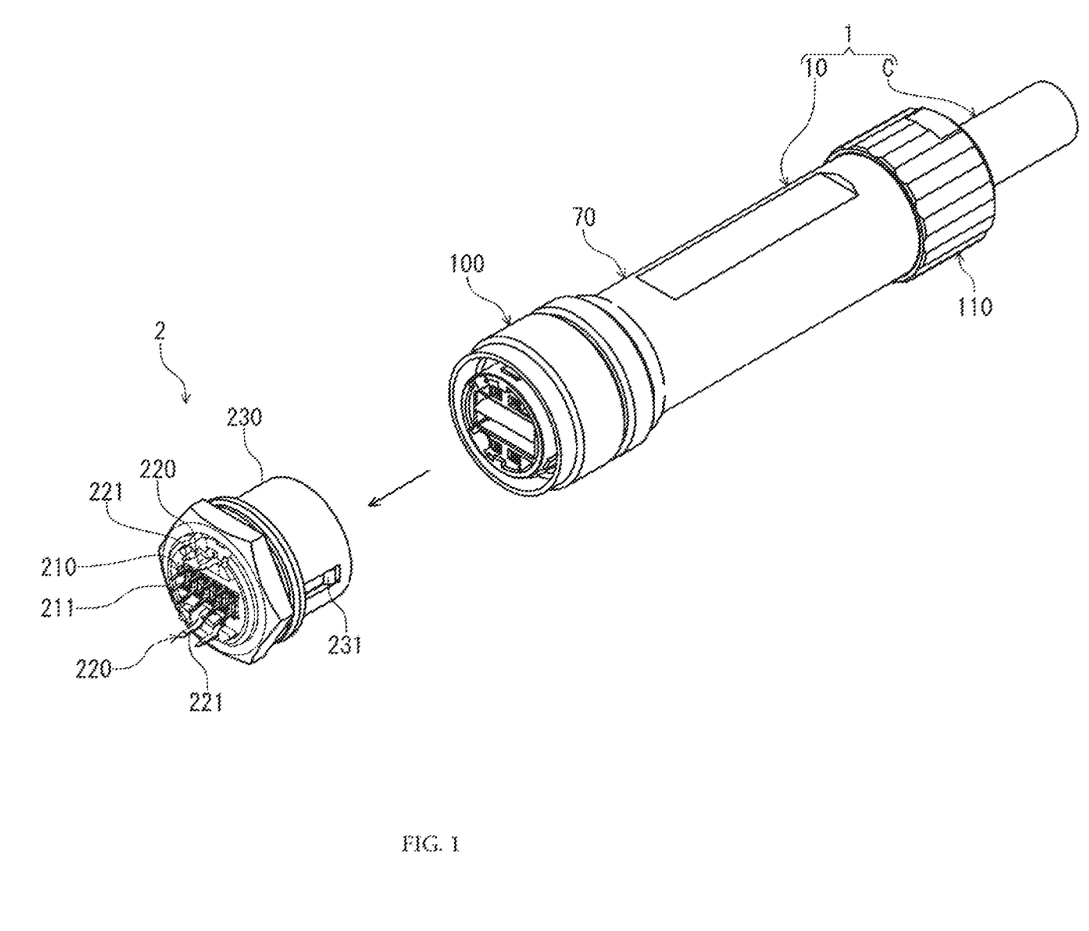
FIG. 1 is an oblique view of the cable-equipped connector pertaining to an embodiment of the present invention and the mating electrical connector before the connectors are mated and connected.

FIG. 1 is an oblique view of the cable-equipped connector 1 pertaining to an embodiment of the present invention and the mating electrical connector 2 before the connectors are mated and connected. The cable-equipped connector 1 is configured such that a composite cable C, comprising an optical fiber cable OC (see FIG. 4) and electrical cables EC (see FIGS. 3 and 6) in separate systems, is connected to a composite connector 10 (discussed below). The cable-equipped connector 1 is adapted to be electrically connected by way of being mated to the mating electrical connector 2, wherein the connector is to be connected in the direction toward the lower left as shown in FIG. 1. In this embodiment, the direction to the lower left in FIG. 1, that is, the direction of the connector to be connected, is called "forward," the opposite direction (the direction to the upper right in FIG. 1) is called "rearward," and the direction perpendicular to both the forward-and-rearward direction and the upward-and-downward direction is called the "connector width direction."

The mating electrical connector 2, which is the connection counterpart of the cable-equipped connector 1, is provided as a part of an electrical device (not shown); and the cable-equipped connector 1 is adapted to be mated and connected to the mating electrical connector 2 from the rear. The cable-equipped connector 1 and the mating electrical connector 2 constitute a so-called push-pull type connector assembly, and their mating operation itself is publicly known.

As shown in FIG. 1, the cable-equipped connector 1 is configured such that the composite cable C is connected from the rear to the composite connector 10, which has a cylindrical profile that extends in the forward-and-rearward direction. The composite cable C is made as a single cable overall, such that a plurality of optical fiber cables OC (see FIG. 4) and a plurality of electrical cables EC are covered in a bundle therein. In this embodiment, the composite cable C has two optical fiber cables OC and four electrical cables EC, such that in each of the upper and lower halves of the composite connector 10, one optical fiber cable OC and two electrical cables EC are connected. In this embodiment, the optical fiber cables OC are adapted to transmit high-speed signals, and the electrical cables EC transmit low-speed signals or power supply current.

The optical fiber cables OC or the electrical cables EC are respectively exposed from the end of the composite cable C. Also, an optical fiber core OC1 (hereinafter referred to as the "cable-side optical fiber core OC1") is exposed from the end of an optical fiber cable OC. The electrical cable terminals 170, which electrically connect to the mating electrical connector 2, are attached to the end of the electrical cables EC by crimping, for example (see FIGS. 3 and 6).

The composite connector 10 is electrically mated and connected to the mating electrical connector 2. When being mated and connected to the mating electrical connector 2, the composite connector 10 converts an optical signal transmitted from the optical fiber cable OC into an electrical signal, and transmits this electrical signal to the side of the mating electrical connector 2. That is, the composite connector 10 functions as an opto-electrical conversion connector. On the other hand, the composite connector 10 transmits an electrical signal from the electrical cables EC directly as an electrical signal, without performing signal conversion, to the side of the mating electrical connector 2.

Figure 2:
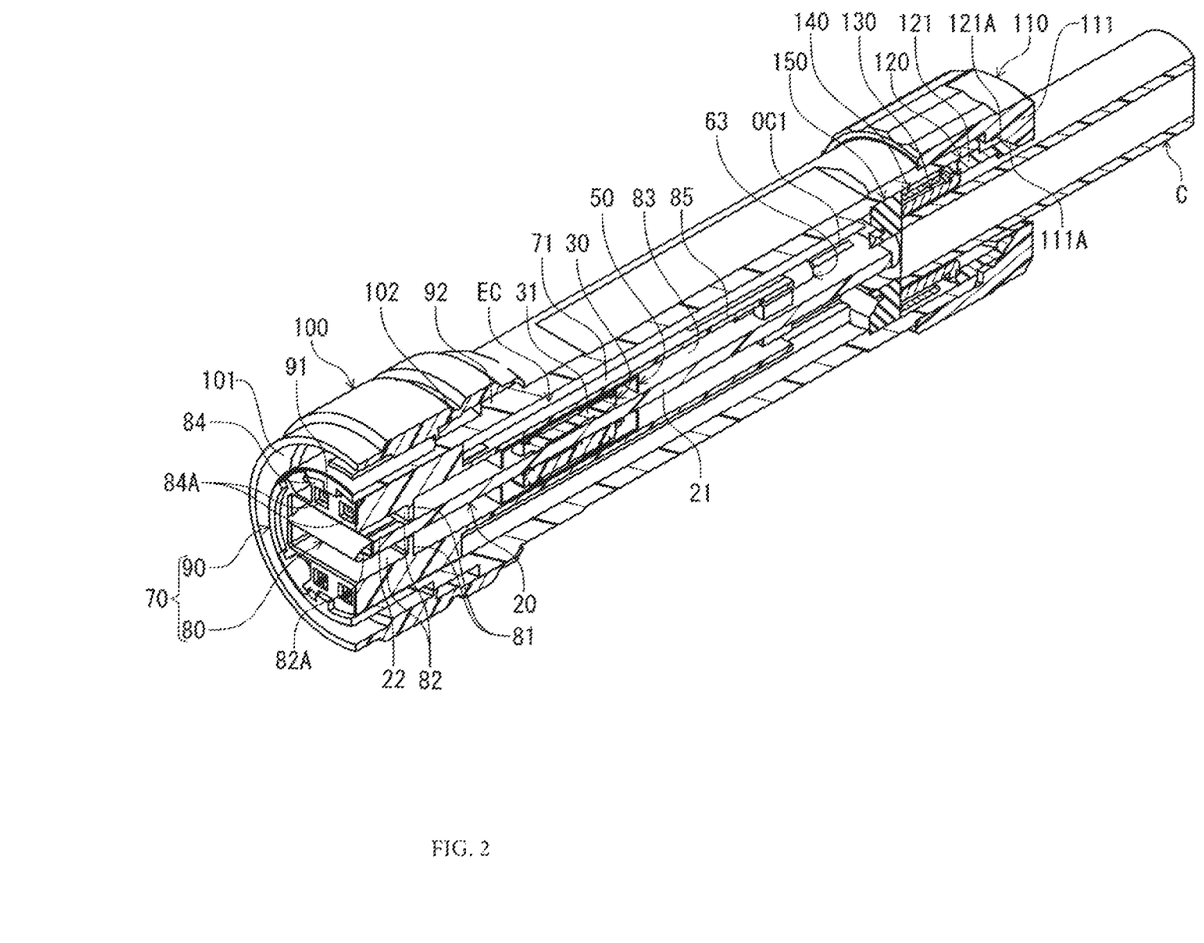
FIG. 2 is an oblique cross section in a plane perpendicular to the connector width direction of the cable-equipped connector in FIG. 1.
Figure 3:
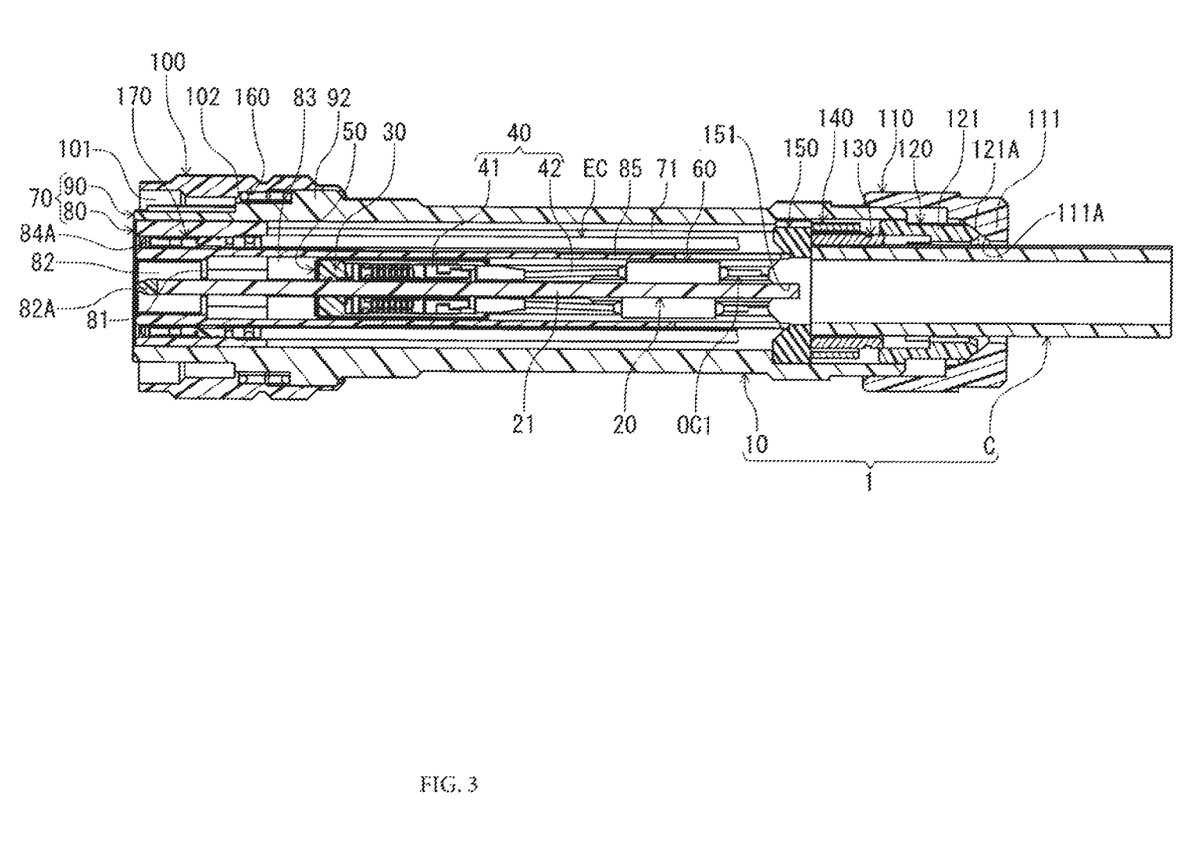
FIG. 3 is a cross section in a plane perpendicular to the connector width direction of the cable-equipped connector in FIG. 1.
Figure 4:
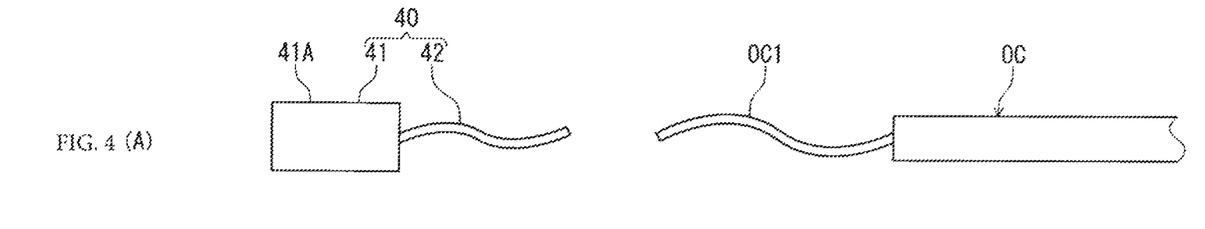
FIGS. 4A-4C include simplified views of parts of the process for manufacturing a cable-equipped connector, with FIG. 4A showing the state before the conversion element-side optical fiber core and the cable-side optical fiber core are connected, FIG. 4B the state in which the optical fiber cores in FIG. 4A are connected together and the connected portion is supported in an optical fiber connection support, and FIG. 4C the state in which the conversion element in FIG. 4B is connected to an electrical connection element on a circuit board, while the optical fiber connection support is disposed on the circuit board.

FIGS. 2 and 3 show the internal configuration of the composite connector 10. FIG. 2 is an oblique cross section in a plane perpendicular to the connector width direction of the cable-equipped connector in FIG. 1, and shows a cross section at a position that is offset to the front side (the lower right in FIG. 2) from the center in the connector width direction. FIG. 3 is a cross section in a plane perpendicular to the connector width direction of the cable-equipped connector in FIG. 1, and shows a cross section at a position that is slightly offset to the back side in FIG. 3 from the position in FIG. 2 in the connector width direction, and more specifically, the view at the location of the terminal holding holes 84A (discussed below). Also, in FIGS. 2 and 3, only the portions of the optical fiber cables OC and the electrical cables EC housed in the composite connector 10 are shown, while the other portions are omitted from the drawings (the same applies to FIGS. 5 to 7).

As shown in FIGS. 2 and 3, the composite connector 10 mainly comprises: a circuit board 20 that transmits electrical signals; an electrical connection element 30 that is mounted on the mounting face of the circuit board 20; a conversion element 40 that is electrically connected to the electrical connection element 30 and converts optical signals and electrical signals; a shield member 50 that covers the electrical connection element 30 and the conversion element 40; an optical fiber connection support 60 that is disposed on the mounting face of the circuit board 20 to support the connected portion of the conversion element-side optical fiber core 42 (discussed below) and the cable-side optical fiber core OC1; a housing 70 that houses the circuit board 20, the electrical connection element 30, the conversion element 40, the shield member 50, the optical fiber connection support 60 and the front ends of the electrical cables EC; an outer cylinder member 100 that is attached to the front end of the housing 70; and a fastening member 110 that is attached to the rear end of the housing 70.

As shown in FIGS. 2 and 3, in this embodiment, the composite connector 10 is configured symmetrically in the upward-and-downward direction with respect to the circuit board 20 (in the direction of the thickness of the circuit board 20), such that the circuit board 20 is disposed at the center in the upward-and-downward direction. In the following description of the configuration of the composite connector 10, excluding the description of the configuration of the circuit board 20, the configuration of the upper half will be described, but the configuration of the lower half will not be described since it is merely a vertical inversion of the upper half.

As shown in FIG. 2, the circuit board 20 is provided at the center in the upward-and-downward direction in the housing 70, such that its board surface extends in the forward-and-rearward direction perpendicular to the upward-and-downward direction. The circuit board 20 has circuit components, for transmitting electrical signals, formed on the upper and lower faces of a substrate 21 that is in the form of a plate made of an electrically insulating material, and these upper and lower faces make up the mounting faces. The above-mentioned circuit components comprise a mounting area (not shown) to which the electrical connection element 30 is soldered at the center of the substrate 21 in the forward-and-rearward direction, connection components 22 (see FIGS. 5 and 6) that are provided at the front end of the substrate 21 and can be connected to the mating electrical connector 2, and wiring (not shown) that extends in the forward-and-rearward direction to link the mounting area and the connection components 22.

In this embodiment, the electrical connection element 30 is soldered to the mounting area of the circuit board 20 and also serves as an electrical connector for the circuit board, and the electrical connection element 30 is electrically connected to the conversion element 40 by mating the conversion element 40 thereto from above (see FIG. 4C). This electrical connection element 30 comprises a plurality of terminals (not shown) arranged in the forward-and-rearward direction, and a housing 31 in which these terminals are arranged and held. As shown in FIG. 4C, in the housing 31, the receiver 31A for receiving the conversion element 40 is provided, with the opening of the receiver 31A facing upward.

In this embodiment, the conversion element 40 is a connector that converts the optical signals transmitted from the optical fiber cable OC into electrical signals. As shown in FIG. 4C, the conversion element 40 comprises a conversion element main body 41 that is mated from above to the receiver 31A of the electrical connection element 30 and an optical fiber core 42 that extends to the rear (to the right in FIG. 4C) from the conversion element main body 41 (hereinafter the optical fiber core 42 is referred to as the "conversion element-side optical fiber core 42").

The conversion element main body 41 comprises a light-receiving element (not shown) that converts the optical signals transmitted from the optical fiber cables OC into electrical signals, a drive device (not shown) that drives the light-receiving element, a plurality of terminals (not shown) for transmitting the electrical signals converted from optical signals by the light-receiving element, and a housing 41A (see FIGS. 4A to 4C) that holds the light-receiving element, the drive device and the plurality of terminals. The light-receiving element is, for example, an optical semiconductor element for converting optical signals into electrical signals constituted by a surface light-receiving type element (such as a photodiode (PD)) or the like. The drive device is constituted by, for example, a transimpedance amplifier/limiting amplifier (TIA/LA).

Also, in this embodiment, the power is supplied from the side of the circuit board 20 through the electrical connection element 30 to drive the drive device. Therefore, even when the electrical cables EC are used as power supply cables, the power to the drive device will not be supplied through the electrical cables EC. As a result, as will be discussed below, in addition to disposing the conversion element 40 inside an inner housing member 80, disposing the front ends of the electrical cables EC outside the inner housing member 80 and an upper wall 85, which serves as a partition of the inner housing member 80, enables the conversion element 40 and the electrical cables EC to be separated (see FIG. 3, for example).

The conversion element-side optical fiber core 42 is held in the housing 41A, thereby being connected to the conversion element main body 41, with the front end of the conversion element-side optical fiber core 42 being aligned with the light-receiving element of the conversion element main body 41. Also, as will be discussed below, inside a support hole 61 of the optical fiber connection support 60, the rear end of the conversion element-side optical fiber core 42 is connected to the front end of the cable-side optical fiber core OC1, with the rear end of the conversion element-side optical fiber core 42 being aligned with the cable-side optical fiber core OC1 (see FIGS. 4B and 4C).

In this embodiment, the conversion element 40 may convert optical signals into electrical signals as mentioned above, but alternatively, the conversion element 40 may be adapted to convert electrical signals transmitted from the electrical connection element 30 into optical signals by the conversion element 40. In the latter case, instead of the light-receiving element, for example, a surface light-emitting type element (such as a vertical cavity surface-emitting laser (VCSEL) type element) or the like can be provided to the conversion element 40. In this case, an example of the drive device includes a device to drive the above-mentioned light-emitting element (such as a VCSEL driver).

The shield member 50 is made by bending a sheet metal material in the sheet thickness direction, and has a cuboid shape with the opening facing downward as shown in FIGS. 2 and 3. The shield member 50 is soldered to the mounting face of the circuit board 20, such that the electrical connection element 30 and the conversion element 40 that are mated and connected to each other are covered by the shield member 50. That is, the shield member 50 surrounds the electrical connection element 30 and the conversion element 40 from above as well as from four sides (both sides in the forward-and-rearward direction and both sides in the connector width direction) that are perpendicular to the upward-and-downward direction. As a result, electrical signals transmitted between the electrical connection element 30 and the conversion element 40 are not susceptible to noise from the outside, particularly from other electrical signals transmitted by the electrical cables EC.

As shown in FIGS. 3 to 6, the optical fiber connection support 60 is a member for supporting the connected portion of the rear end of the conversion element-side optical fiber core 42 and the front end of the cable-side optical fiber core OC1, and in this embodiment, the optical fiber connection support 60 is made up of a capillary. The optical fiber connection support 60 has a cylindrical shape that extends in the forward-and-rearward direction, and passing through its interior, the support hole 61 is formed as shown in FIGS. 4B and 4C, such that the support hole 61 has a diameter slightly larger than that of each of the optical fiber cores, 42 or OC1, and extends in the forward-and-rearward direction. In this optical fiber connection support 60, by inserting into the support hole 61 the rear end of the conversion element-side optical fiber core 42 from the front and the front end of the cable-side optical fiber core OC1 from the rear to bring them into contact, the conversion element-side optical fiber core 42 and the cable-side optical fiber core OC1 can be automatically aligned inside the support hole 61. That is, the support hole 61 functions as an alignment support that automatically aligns the optical fiber cores 42 and OC1 by supporting them. Also, when the optical fiber cores 42 and OC1 are connected together, an adhesive is injected ahead of time into the support hole 61, and after the optical fiber cores 42 and OC1 have come into contact inside the support hole 61, this adhesive is cured to fix and support the connected portion of the two.

The optical fiber connection support 60 is not limited to being the above-mentioned capillary, and various members can be employed, such as a mechanical splice or other such member having a groove that supports and aligns the ends of the optical fiber cores.

Figure 5:
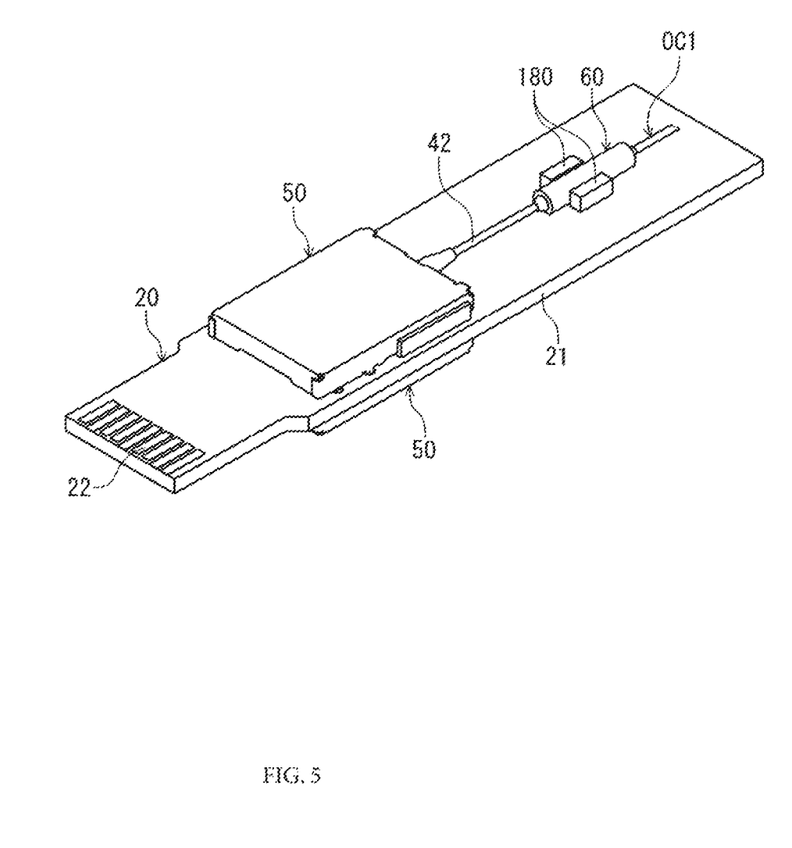
FIG. 5 is an oblique view in which the optical fiber connection support, etc., are disposed on a mounting face of the circuit board.
Figure 6:
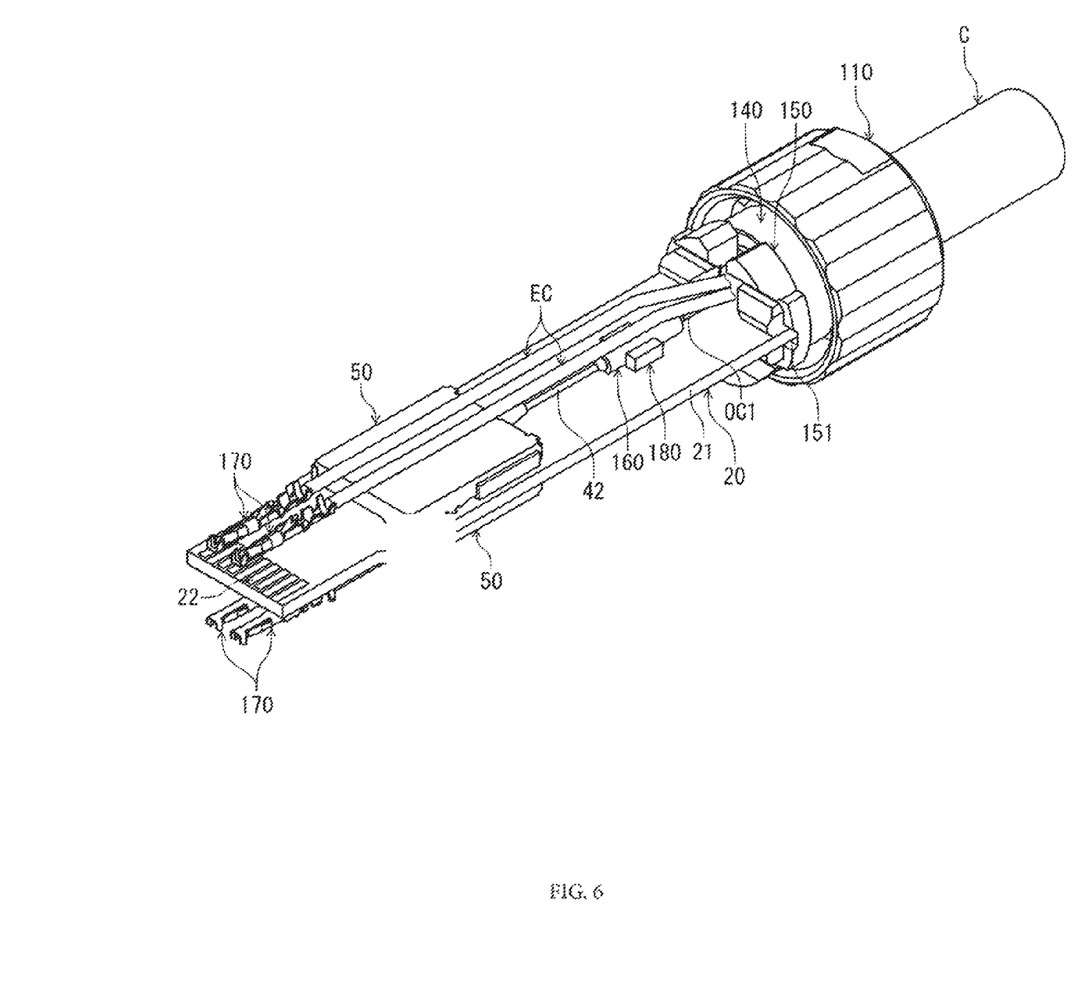
FIG. 6 is an oblique view of the circuit board in FIG. 5 with electrical cables, etc.

The optical fiber connection support 60 is fixed on the mounting face of the circuit board 20 by a tape or the like at a position to the rear of the electrical connection element 30 and the conversion element 40 covered by the shield member 50 and at the center in the connector width direction (see FIGS. 5 and 6). In this embodiment, the optical fiber connection support 60 and the electrical connection element 30 and conversion element 40 are disposed in such a way that these are positioned to partly overlap in the connector width direction, and the size of the composite connector 10 can thereby be made smaller in the connector width direction. Also, as seen clearly in FIGS. 5 and 6, on each side in the connector width direction of the optical fiber connection support 60, the restricting member 180 is attached to the upper face of the circuit board 20 so as to be adjacent to the optical fiber connection support 60, and these two restricting members 180 prevent unintended movement in the connector width direction of the optical fiber connection support 60.

As shown in FIGS. 2 and 3, the housing 70 comprises the inner housing member 80, which is made from an electrically insulating material and extends in the forward-and-rearward direction, and an outer housing member 90, which is made from an electrically insulating material and extends in the forward-and-rearward direction and houses the inner housing member 80.

Figure 7:
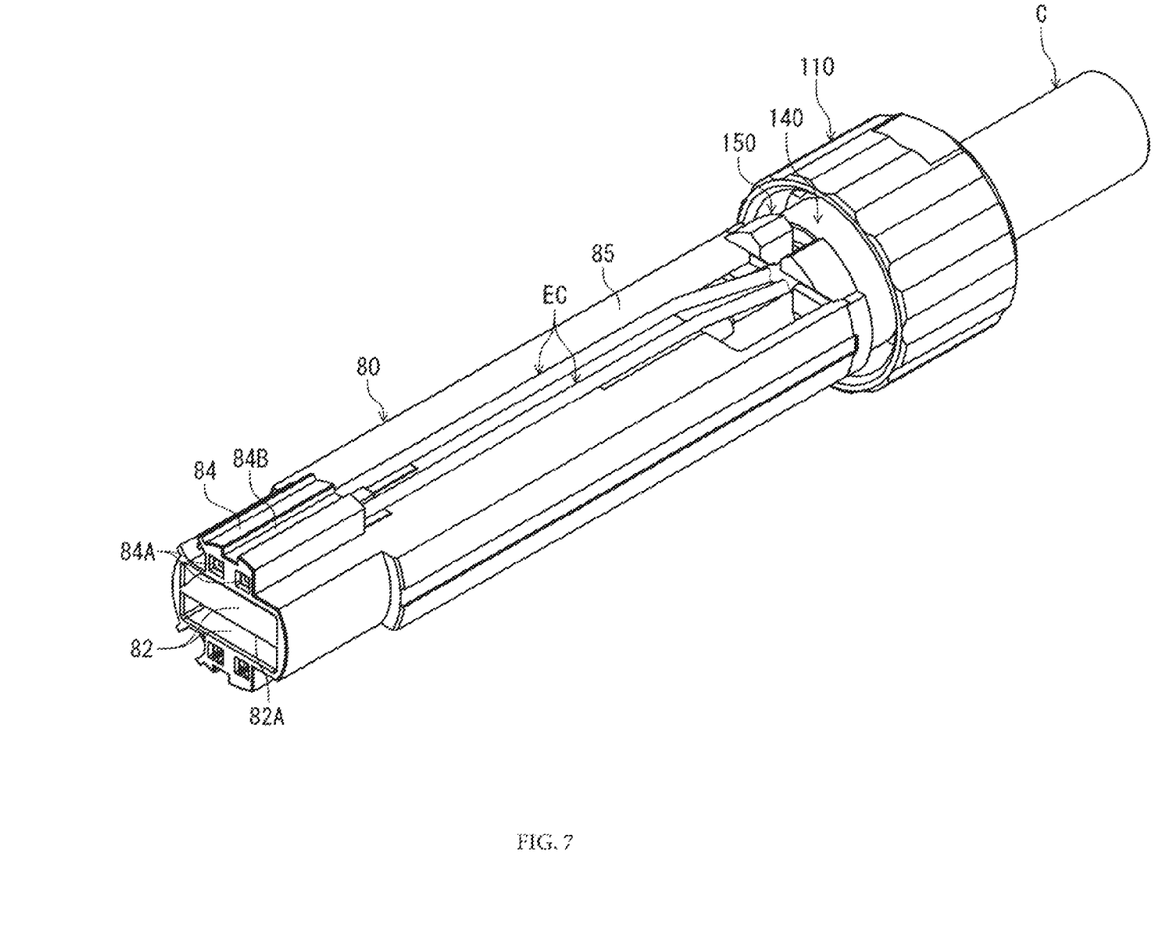
FIG. 7 is an oblique view in which the circuit board in FIG. 6 is housed in an inner housing member.

As seen clearly in FIG. 7, the inner housing member 80 is made in a shape in which the upper and lower faces are flat, and the side faces in the connector width direction are curved and convex. As shown in FIG. 2, a space having a square cross section in the forward-and-rearward direction is formed in the interior of the inner housing member 80, such that the space passes through in the forward-and-rearward direction. This space is divided in two in the forward-and-rearward direction by a partition 81 provided at a position near the front end.

The space forward of the partition 81 houses, at the center in the upward-and-downward direction, the front end of the circuit board 20 protruding forward through the partition 81, that is, the space where the connection component 22 is provided, and this space forward of the partition 81 is divided in two in the upward-and-downward direction by the front end of the circuit board 20. The spaces resulting from this division are respectively formed as inner mating recesses 82 for receiving, from the front, the corresponding inner mating components (not shown) of the mating electrical connector 2. Also, as shown in FIG. 2, within said space, at the front end and at the center in the upward-and-downward direction, a positioning component 82A is provided that extends in the connector width direction over the entire gap between inner wall faces that oppose each other in the connector width direction, and the circuit board 20 is adapted to be positioned in the forward-and-rearward direction by bringing the front end face of the circuit board 20 into contact with the rear face of the positioning component 82A.

The space rearward of the partition 81 houses, at the center in the upward-and-downward direction, the portion of the circuit board 20 excluding the front end part, and thus the space rearward of the partition 81 is divided in two in the upward-and-downward direction by the circuit board 20. The spaces resulting from this division are respectively formed as inner housing spaces 83 for housing the electrical connection element 30, the conversion element 40 (see FIGS. 4A to 4C), the shield member 50, and the optical fiber connection support 60.

As seen clearly in FIG. 7, the inner housing member 80 has a terminal holder 84 that protrudes in a substantially cuboid shape from its upper face at a position on the front end side. In the terminal holder 84, two terminal holding holes 84A are formed and arranged in the connector width direction so as to hold the electrical cable terminals 170 attached to the front ends of the electrical cables EC. These two terminal holding holes 84A are formed such that they pass through the terminal holder 84 in the forward-and-rearward direction, and hold the electrical cable terminals 170 that are inserted from the rear.

Also, as shown in FIG. 7, a groove 84B that extends in the forward-and-rearward direction is formed in the upper face of the terminal holder 84. As will be discussed below, this groove 84B is adapted to position the outer housing member 90 in the connector width direction by latching onto a rib 91 on the outer housing member 90 in the connector width direction.

As shown in FIGS. 2 and 3, an outer housing space 71 that extends in the forward-and-rearward direction between the inner housing member 80 and the outer housing member 90 is formed to the rear of the terminal holder 84, and the front ends of the electrical cables EC are housed in this outer housing space 71. Thus, in this embodiment, the circuit board 20, the electrical connection element 30 and the conversion element 40 are located inside the inner housing member 80, while the front ends of the electrical cables EC are located outside the inner housing member 80. That is, since they are isolated in the upward-and-downward direction by the upper wall 85, which serves as a partition of the inner housing member 80, they will not be in close proximity to each other. Therefore, electrical signals converted from optical signals by the conversion element 40 are less apt to be affected by noise from other electrical signals transmitted by the electrical cables EC. In particular, when the electrical cables EC are used as power supply cables, the power supply current is usually high, which generates a large amount of noise, so this embodiment will be very effective in reducing the effect of noise.

As shown in FIG. 2, the outer housing member 90 has an approximately cylindrical shape that extends longer than the circuit board 20 and the inner housing member 80 in the forward-and-rearward direction, and its rear end is located to the rear of the rear ends of the circuit board 20 and the inner housing member 80. The rib 91, which extends in the forward-and-rearward direction and protrudes downward from the inner peripheral face at an upper end location, is formed at the front end of the outer housing member 90. This rib 91 fits into the groove 84B of the terminal holder 84 of the inner housing member 80 (see FIG. 7), and as mentioned above, the rib 91 is positioned in the connector width direction by latching the groove 84B in the connector width direction. Also, on the outer housing member 90, an outer peripheral protrusion 92 is provided near the front end, which protrudes radially outward from the outer peripheral face over the entire circumference.

As seen clearly in FIGS. 1 to 3, the outer cylinder member 100 has a hollow cylindrical shape extending in the forward-and-rearward direction, and is attached to the front end of the housing 70 such that the front end of the housing 70 is housed in the outer cylinder member 100. The annular space formed between the inner peripheral face of the outer cylinder member 100 and the outer peripheral face of the front end of the outer housing member 90 of the housing 70 functions as an outer mating recess 101 for receiving, from the front, an outer mating component 230 (see FIG. 1) corresponding to the mating electrical connector.

On the outer cylinder member 100, an inner peripheral protrusion 102 is provided at the center in the forward-and-rearward direction, which protrudes radially inward from the inner peripheral face over the entire circumference. As seen clearly in FIGS. 2 and 3, the inner peripheral protrusion 102 is located forward of the outer peripheral protrusion 92 of the outer housing member 90. As shown in FIG. 3, a coil spring 160 is provided in the space formed in the forward-and-rearward direction between the inner peripheral protrusion 102 of the outer cylinder member 100 and the outer peripheral protrusion 92 of the outer housing member 90. The outer cylinder member 100 is of the so-called push-pull type, whereby in the course of mating with the mating electrical connector 2, the outer cylinder member 100 can slide in the forward-and-rearward direction with respect to the outer housing member 90 by the expansion and contraction of the coil spring 160. As discussed above, this push-pull mating operation is itself known, and will therefore not be described again here.

As shown in FIGS. 2 and 3, the fastening member 110 has a cylindrical shape extending in the forward-and-rearward direction, the composite cable C is inserted into it, and it is screwed to the outer peripheral face of the rear end of the outer housing member 90. On the rear end of the fastening member 110, a pressing protrusion 111 is provided, which protrudes radially inward from the inner peripheral face of the fastening member 110 over the entire circumference. The front end face of the pressing protrusion 111 is provided as a tapered pressing face 111A, which tapers radially outward toward the front around the fastening member 110.

A cable-holding member 120 for holding the composite cable C is provided in the interior of the fastening member 110. The cable-holding member 120 has a hollow cylindrical shape, with the axis running in the forward-and-rearward direction, and the composite cable C is inserted therethrough. In the cable-holding member 120, slits (not shown) that extend in the forward-and-rearward direction are formed at a plurality of locations in the peripheral direction, thereby forming a plurality of cable-holding pieces 121 that are elastically displaceable in the radial direction over the entire rear half of the cable-holding member 120.

At the rear end of a cable-holding piece 121, a tapered pressed face 121A is provided, which tapers toward the rear and inward in the radial direction around the cable-holding member 120. The pressed face 121A is in contact with the pressing face 111A of the fastening member 110 and is adapted to simultaneously receive, from the pressing face 111A, the inward pressing force in the radial direction mentioned above and the forward pressing force. As will be discussed below, when the pressed faces 121A receive the inward pressing force in the radial direction mentioned above, the cable-holding pieces 121 are elastically displaced in the same direction to hold the composite cable C. Also, as will be discussed below, the pressed faces 121A receive the forward pressing force, thereby positioning the circuit board 20 in the forward-and-rearward direction. The fastening member 110 may be attached to the rear end of the outer housing member 90 by screwing, but the method of attaching the fastening member 110 should not be limited to this, and the fastening member 110 can be, for example, attached from the rear such that the rear end of the outer housing member is press-fitted to the fastening member.

A metal Kevlar-retaining member 130 for retaining the Kevlar® exposed from the front end of the composite cable C and a metal crimp ring 140 are provided forward of the cable-holding member 120. As seen clearly in FIG. 3, the front ends of the Kevlar-retaining member 130 and the crimp ring 140 are placed at the same location as the front end of the composite cable C. The Kevlar-retaining member 130 has a hollow cylindrical shape, with the axis running in the forward-and-rearward direction; the composite cable C is inserted therethrough, and the Kevlar-retaining member 130 is attached to the outer peripheral face of the composite cable C. Although not depicted in the drawings, the rear end face of the Kevlar-retaining member 130 is in partial contact with the front end face of the cable-holding member 120 in some areas in the peripheral direction of the Kevlar-retaining member 130 and, as will be discussed below, the rear end face of the Kevlar-retaining member 130 can receive the forward pressing force from the cable-holding member 120.

The crimp ring 140 has a hollow cylindrical shape, with the axis running in the forward-and-rearward direction, and the Kevlar-retaining member 130 is inserted therethrough. The Kevlar exposed from the end of the composite cable C is disposed between the crimp ring 140 and the Kevlar-retaining member 130, and by crimping the crimp ring 140 in the radial direction, the exposed Kevlar is sandwiched between the crimp ring 140 and the Kevlar-retaining member 130. Even when the crimp ring 140 is crimped, the Kevlar-retaining member 130 is not deformed in the radial direction, thus preventing damage to the electrical cables EC and the optical fiber cables OC in the composite cable C.

A rubber ring 150 is provided forward of the Kevlar-retaining member 130 and the crimp ring 140. The rubber ring 150 has a hole, the diameter being about the same as the inside diameter of the covering of the composite cable C, with the axis running in the forward-and-rearward direction. On the front end face of the rubber ring 150, a slit 151 is formed at the center in the upward-and-downward direction to hold the rear end of the circuit board 20. The rear end face of the rubber ring 150 is in contact with the front end faces of the Kevlar-retaining member 130 and the crimp ring 140 and, as will be discussed below, the rear end face of the rubber ring 150 can receive the forward pressing force from the Kevlar-retaining member 130 and the crimp ring 140.

As shown in FIG. 1, the mating electrical connector 2 has a substantially cylindrical shape, which extends in the forward-and-rearward direction, and the cable-equipped connector 1 is to be mated and connected to the mating electrical connector 2 from the rear. As shown in FIG. 1, the mating electrical connector 2 comprises a plurality of inner mating terminals 210 that are arranged in the middle in the upward-and-downward direction, and a plurality of outer mating terminals 220 positioned such that the inner mating terminals 210 flank the outer mating terminals 220 in the upward-and-downward direction. The inner mating terminals 210 come into communication with the connection components 22 of the circuit board 20 of the cable-equipped connector 1 when the inner mating terminals 210 are mated and connected to the cable-equipped connector 1. Also, the outer mating terminals 220 come into communication with the electrical cable terminals 170 attached to the electrical cables EC of the cable-equipped connector 1 when the outer mating terminals 220 are mated and connected to the cable-equipped connector 1. The inner mating terminals 210 and the outer mating terminals 220 comprise connection legs 211 and 221, respectively, which extend forward to jut out from the housing. The inner mating terminals 210 and the outer mating terminals 220 are adapted to be connected via the connection legs 211 and 221 to the corresponding circuit components (not shown) of an electrical device. Also, in the corresponding cylindrically shaped outer mating component 230 of the mating electrical connector 2, in order to lock with the lock component (not shown) of the cable-equipped connector 1, a corresponding lock component 231 is provided on both sides in the connector width direction.

The process for manufacturing the cable-equipped connector 1 pertaining to this embodiment will now be described. The description will focus on the steps in the upper half of the composite connector 10. Since the steps for the lower half are, except for being vertically inverted, the same as those for the upper half, they will not be described. Also, the order of the steps described below is merely an example, and the order of the steps may be changed as needed.

First, the fastening member 110, the cable-holding member 120, the Kevlar-retaining member 130, the crimp ring 140 and the rubber ring 150 are, in this order from the front, allowed to slip over the front end of the composite cable C. Next, the cover is removed from the front end of the composite cable C to expose the two cable-side optical fiber cores and four electrical cables EC. Then, the Kevlar, which has been exposed upon the removal of the cover from the front end of the composite cable C, is folded back and disposed between the Kevlar-retaining member 130 and the crimp ring 140 to sandwich the Kevlar therebetween by crimping the crimp ring 140 in the radial direction. Also, the electrical cable terminals 170, which are formed by bending a sheet metal materials, are press-fitted to the front ends of each of the electrical cables EC.

Meanwhile, the conversion element main body 41 is made in advance by holding, in the housing 41A, the light-receiving element, the drive device and a plurality of terminals by means of integral molding, and the conversion element-side optical fiber core 42 is connected to the conversion element main body 41 in a state of alignment with the light-receiving element to construct the finished conversion element 40.

Next, an adhesive is injected into the support hole 61 of the optical fiber connection support 60, and as shown in FIGS. 4A and 4B, the rear end of the conversion element-side optical fiber core 42 of the conversion element 40 is inserted from the front into the support hole 61 of the optical fiber connection support 60, the front end of the cable-side optical fiber core OC1 is inserted from the rear into the support hole 61, and the end faces of the optical fiber cores are butted together. As a result, the optical fiber cores are automatically aligned and are connected due to the curing of the adhesive, so that the connected portions are supported within the support hole 61. The optical fiber cores 42 and OC1 may be connected in a state in which their coatings have been removed, if needed.

Also, the electrical connection element 30 is mounted by soldering to the mounting area on the mounting face of the circuit board 20 (see FIG. 4C). Then, as shown in FIG. 4C, the conversion element 40 is mated and connected to the electrical connection element 30 from above, and then, at a position to the rear of the electrical connection element 30, the optical fiber connection support 60 is fixed on the mounting face of the circuit board 20 by tape or the like. Also, the restricting members 180 are attached to the mounting face on both sides of the optical fiber connection support 60 in the connector width direction to restrict unintended movement of the optical fiber connection support 60 in the connector width direction.

Next, the shield member 50 is put in place from above so as to cover the electrical connection element 30 and the conversion element 40, which are mated together, and the shield member 50 is soldered to the mounting face of the circuit board 20 (see FIG. 5). The composite cable C, the fastening member 110, the rubber ring 150 and so forth are not shown in FIG. 5, but actually, the rear end of the circuit board 20 is supported by the rubber ring 150, and the electrical cables EC exposed from the composite cable C are disposed above the optical fiber core, as shown in FIG. 6.

Next, as shown in FIG. 7, the inner housing member 80 is provided from the front, while the circuit board 20 is housed in the internal space of the inner housing member 80 from the rear. At this point, the circuit board 20 is inserted until it comes into contact with the positioning component 82A of the inner housing member 80. As a result, the above-mentioned internal space is divided into the two inner housing spaces 83 in the upward-and-downward direction by the circuit board 20, and the electrical connection element 30, the conversion element 40, the shield member 50 and the optical fiber connection support 60 are housed in the inner housing spaces 83 (see FIGS. 2 and 3).

Also, the electrical cable terminals 170 attached to the front end of the electrical cables EC are attached by inserting them from the rear into the terminal holding holes 84A of the inner housing member 80, thereby connecting the electrical cables EC to the inner housing member 80. As a result, while the electrical cable terminals 170 are supported in the terminal holder 84, the front ends of the electrical cables EC extend along the upper face of the inner housing member 80 in the forward-and-rearward direction outside the inner housing member 80, as shown in FIG. 3.

Also, the cylindrical member 100 is attached to the front end of the outer housing member 90 by inserting the outer housing member 90 into the cylindrical member 100 from the front. At this point, the coil spring 160 is pre-attached to the front end of the outer housing member 90, and as a result, with the installation of the outer cylinder member 100 being completed, the coil spring 160 is provided in the gap in the forward-and-rearward direction between the inner peripheral protrusion 102 of the outer cylinder member 100 and the outer peripheral protrusion 92 of the outer housing member 90 to enable the outer cylinder member 100 to slide in the forward-and-rearward direction with respect to the outer housing member 90 by the expansion and contraction of the coil spring 160.

Next, the outer housing member 90, to which the outer cylinder member 100 is attached, is attached to the inner housing member 80 from the front. At this point, the rib 91 of the outer housing member 90 is inserted from the front into the groove 84B of the terminal holder 84 of the inner housing member 80 and is latched with this groove 84B in the connector width direction, so that the outer housing member 90 is positioned in the connector width direction. Also, the inner peripheral face of the outer housing member 90 is brought into contact with the upper face of the terminal holder 84 of the inner housing member 80, thereby positioning the outer housing member 90 in the upward-and-downward direction. Once the outer housing member 90 has thus been attached to the inner housing member 80, the outer housing space 71 is formed between the outer housing member 90 and the inner housing member 80, and as shown in FIGS. 2 and 3, the front ends of the electrical cables EC are housed in the outer housing space 71.

The fastening member 110 is then screwed to the rear end of the outer housing member 90. During this screwing, when fastening member 110 moves forward, the pressing face 111A of the fastening member 110 comes into contact with the pressed faces 121A of the cable-holding pieces 121 of the cable-holding member 120 to press the pressed faces 121A. As a result, the inward pressing force in the radial direction and the forward pressing force will act on the pressed faces 121A simultaneously.

When the pressed faces 121A receive the inward pressing force in the radial direction mentioned above, the cable-holding pieces 121 are elastically displaced inward in the radial direction and pressed against the outer peripheral face of the composite cable C. As a result, the composite cable C is supported by the cable-holding pieces 121 to prevent the composite cable C from accidentally coming loose, etc., from the composite connector 10. Also, when the pressed faces 121A receive the forward pressing force, the cable-holding member 120 is moved forward to press the rear end face of the Kevlar-retaining member 130 forward.

When the rear end face of the Kevlar-retaining member 130 is pressed forward, the Kevlar-retaining member 130, the crimp ring 140 and the composite cable C move forward to press the rear end face of the rubber ring 150 forward. When being pressed, the rubber ring 150 moves forward together with the circuit board 20. The front end of the circuit board 20 then comes in contact with the component 82A of the inner housing member 80 to restrict any further forward movement, and the circuit board 20 is thus positioned in the forward-and-rearward direction, at which point the work of screwing down the fastening member 110 is complete. This concludes the steps of manufacturing the cable-equipped connector 1.

In this embodiment, as discussed above, in the manufacture of the cable-equipped connector 1, the conversion element-side optical fiber core 42 of the conversion element 40 and the cable-side optical fiber core OC1 of the optical fiber cables OC are connected, and their connected portions are supported by the optical fiber connection support 60. That is, there is no need for the end of the cable-side optical fiber core OC1 that is contiguous with the main portion of the composite cable C (the portion that makes up the overall length of the composite cable in a finished product) to be aligned with the conversion element main body 41. Also, when the conversion element-side optical fiber core 42 and the cable-side optical fiber core OC1 are connected, the optical fiber cores 42 and OC1 are together automatically aligned merely by disposing both the optical fiber cores 42 and OC1 in the support hole 61 of the optical fiber connection support 60, so the work of connecting the optical fiber cores 42 and OC1 is very simple. Therefore, in this embodiment, the main portion of the optical fiber cable OC and the conversion element 40 can be connected in a simple manner and in a short time.

Also, in this embodiment, the conversion element 40 is manufactured before the conversion element-side optical fiber core 42 and the cable-side optical fiber core OC1 are connected. As discussed above, the manufacture of the conversion element 40 entails the work of aligning and connecting the conversion element-side optical fiber core 42 with the conversion element main body 41. However, since the overall length of the conversion element-side optical fiber core 42 is short, the work involved in connecting the conversion element-side optical fiber core 42 to the conversion element main body 41 is simple compared to when the cable-side optical fiber core contiguous with the main portion of a long optical fiber cable is connected to the conversion element main body as was done in the past.

Also, even when the overall length of the main portion of the composite cable C has been established and the conversion element-side optical fiber core 42 and the cable-side optical fiber core OC1 are connected, preparing, in advance of establishing the above-mentioned overall length of the overall product, a conversion element 40 comprising a conversion element-side optical fiber core 42 of a specified length allows such connection work to be carried out quickly, and as a result the duration from manufacturing preparation to completion of the finished product can be much shorter than in the past. Also, even if the overall length of the main portion varies in each finished product, since a conversion element 40 having a conversion element-side optical fiber core of the same length can be used for all the products, there is no need to prepare various conversion elements having different lengths of the conversion element-side optical fiber core nor a need to prepare a dedicated alignment apparatus suited to the overall length of the main portion of the composite cable C for each product, which can suppress cost increases.

In this embodiment, the conversion element 40 may be connected to the circuit components of the circuit board 20 indirectly, via the electrical connection element 30 or, alternatively, the electrical connection element may be omitted and the conversion element soldered directly to the circuit components of the circuit board. Also, in this embodiment, the conversion element 40 may be electrically connected to the inner mating terminals 210 (in the corresponding component for connection) of the mating electrical connector 2, via the connection component 22 provided at the front end of the circuit board 20 or, alternatively, for example, the conversion element 40 may be connected to the circuit components by disposing an electrical connector on the mounting face at the front end of the circuit board such that the conversion element 40 is mated and connected to mating terminals 210 via the electrical connector.

The composite connector 10 may be connected to both ends in the lengthwise direction of the composite cable C, or it may be connected to only one of the ends.

In this embodiment, the composite connector 10 is configured to be symmetrical with respect to the circuit board 20 in the upward-and-downward direction, so that the electrical connection element 30, the conversion element 40, the optical fiber connection support 60, and other elements are disposed on both sides of the circuit board 20; therefore, the number of the optical fiber cores and electrical cables that can be connected by a single composite connector may be twice the number of such elements disposed on one side of the circuit board 20.

In this embodiment, the electrical cables EC may be isolated from the circuit components of the circuit board 20, the electrical connection element 30, and the conversion element 40 in the upward-and-downward direction, but the direction of the isolation is not limited to this and may be any direction that is perpendicular to the direction in which the connectors are connected together. Therefore, for example, the electrical cables, the circuit components of the circuit board and so forth may be isolated in the connector width direction, by providing, in a housing, a partition serving as a separator having a board surface perpendicular to the connector width direction.

In this embodiment, the electrical cables EC may be housed in the space between the outer housing member 90 and the inner housing member 80, whereby the housing 70 is constituted by two members, the inner housing member 80 and the outer housing member 90, and whereby the circuit board 20, the electrical connection element 30, and the conversion element 40 are housed in the inner housing member 80, while the electrical cables EC are housed in the space between the outer housing member 90 and the inner housing member 80, but having the housing be constituted by two members is not essential, and the housing may be constituted, for example, by a single member. If the housing is constituted by a single member, then by providing, as a separator, a partition that divides the internal space in the housing in the perpendicular direction relative to the forward-and-rearward direction, the electrical cables may be isolated from the circuit components of the circuit board, the electrical connection element, and the conversion element in the perpendicular direction relative to the above-mentioned forward-and-rearward direction. Moreover, in this case, the above-mentioned separator may not be in the form of a wall like the above-mentioned partition, and, for example, the separator may be in the form of a beam, whereby, in the housing, at least one part having such a beam shape is provided, which extends in the perpendicular direction relative to the forward-and-rearward direction in the internal space of the housing.

In this embodiment, the circuit board 20 may be provided with circuit components on each board surface, with the electrical connection element 30, the conversion element 40, the optical fiber connection support 60 and other elements respectively disposed on each board surface. Alternatively, the circuit board 20 may be provided with circuit components on only one board surface, with the above-mentioned elements disposed on this one board surface. Moreover, in this case, the electrical cables may be isolated from the circuit components of the circuit board, the electrical connection element, and the conversion element by means of the substrate of the above-mentioned circuit board, by disposing the electric cables on the side of the circuit board opposite from the side on which the circuit components provided.

In this embodiment, one circuit board may be provided to the composite connector 10, but the number of circuit boards is not limited to one, and two or more circuit boards may be provided. Also, in this embodiment, the circuit components may be provided on the board surface of the circuit board, but the circuit components may alternatively be provided within the substrate. Moreover, the circuit board may be formed such that, as a circuit component, at least one terminal is supported by a substrate.

DESCRIPTION OF THE REFERENCE NUMERALS

1 cable-equipped connector
2 mating electrical connector
10 composite connector
20 circuit board
21 substrate 30 electrical connection element
40 conversion element
42 conversion element-side optical fiber core
50 shield member
60 optical fiber connection support
61 support hole (alignment support)
70 housing
85 upper wall (partition)
170 electrical cable terminal
C composite cable
OC optical fiber cable
OC1 cable-side optical fiber core
EC electrical cable

The invention claimed is:

1. An optical fiber cable-equipped connector, in which an optical fiber cable is connected to an opto-electrical conversion connector that converts optical signals and electrical signals, wherein said opto-electrical conversion connector is electrically connectable to a mating electrical connector, the mating electrical connector being the connection counterpart of the opto-electrical conversion connector, and said optical fiber cable-equipped connector comprises a conversion element, to which a cable-side optical fiber core exposed from the end of said optical fiber cable is connected and which converts optical signals and electrical signals, and a circuit board that is electrically connected to the conversion element;

wherein, in said optical fiber cable-equipped connector, said conversion element comprises a conversion element-side optical fiber core to which the cable-side optical fiber core is connected;

said opto-electrical conversion connector comprises an optical fiber connection support that is disposed on a mounting face of said circuit board to support the connected portions of said conversion element-side optical fiber core and said cable-side optical fiber core; and the optical fiber connection support comprises an alignment support that supports and aligns said conversion element-side optical fiber core and said cable-side optical fiber core, wherein an outer surface of said exposed cable-side optical fiber core directly contacts an inner surface of said alignment support.

2. The optical fiber cable-equipped connector according to claim 1, wherein the opto-electrical conversion connector further comprises an electrical connection element that is disposed on the mounting face of the circuit board to electrically connect the circuit board and the conversion element.

3. The optical fiber cable-equipped connector according to claim 1, wherein the conversion element, the optical fiber connection support, and the cable-side optical fiber core are respectively disposed on both sides of the circuit board of the opto-electrical conversion connector.

4. The optical fiber cable-equipped connector according to claim 1, wherein the opto-electrical conversion connector is respectively connected to both ends in the lengthwise direction of the optical fiber cable.

5. The optical fiber cable-equipped connector according to claim 1, wherein the opto-electrical conversion connector is electrically connectable to the mating electrical connector, with the connector-connecting direction being parallel to the mounting face of the circuit board and facing forward toward the mating electrical connector; and the conversion element is placed forward of the optical fiber connection support and is disposed at a position having an overlapping range with said optical fiber connection support in a direction perpendicular to said connector-connecting direction.

6. The optical fiber cable-equipped connector according to claim 1, wherein the opto-electrical conversion connector is connected to an electrical cable in addition to the optical fiber cable.

* * * * *